United States Patent [19]
Rastegar

[11] Patent Number: 5,764,067
[45] Date of Patent: Jun. 9, 1998

[54] METHOD AND APPARATUS FOR SENSOR SIGNAL CONDITIONING USING LOW-COST, HIGH-ACCURACY ANALOG CIRCUITRY

[76] Inventor: Ali J. Rastegar, 10495 Travis Ct., Gilroy, Calif. 95020

[21] Appl. No.: 435,441

[22] Filed: May 10, 1995

[51] Int. Cl.⁶ .................................................. G01R 17/02
[52] U.S. Cl. ........................ 324/725; 364/573; 324/706; 324/721
[58] Field of Search ........................... 324/706, 720, 324/721, 725; 364/571.03, 573; 73/862.65

[56] References Cited

U.S. PATENT DOCUMENTS

| | | | |
|---|---|---|---|
| 3,577,074 | 5/1971 | Praglin | 324/706 |
| 3,790,910 | 2/1974 | McCormack | 364/573 |
| 3,873,917 | 3/1975 | Kreuzer | 324/706 |
| 3,953,718 | 4/1976 | Cooke | 364/573 |
| 4,618,818 | 10/1986 | Horn | 324/706 |
| 4,992,724 | 2/1991 | Hisanaga | 324/706 |
| 5,063,352 | 11/1991 | Kleinhaus | 324/706 |
| 5,121,064 | 6/1992 | Eller | 324/706 |
| 5,142,238 | 8/1992 | White | 330/9 |
| 5,159,277 | 10/1992 | Mount | 324/706 |
| 5,189,362 | 2/1993 | Doble | 324/706 |
| 5,345,184 | 9/1994 | Andoh | 324/706 |
| 5,461,322 | 10/1995 | Bey, Jr. | 324/706 |
| 5,481,199 | 1/1996 | Anderson | 324/706 |

OTHER PUBLICATIONS

Baskett, et al., *Integrated Sensors Today and Tomorrow*, Sensors, Mar. 1991.

I.C. Sensors, *Temperature Compensation, IC Pressure Sensors*, I.C. Sensors, Inc., Application Note: TN–002, Nov. 1983.

Nagaraj, K., *A Parasitic–Insensitive Area–Efficient Approach to Realizing Very Large Time Constants in Switched–Capacitor Circuits*, IEEE Transactions on Circuits and Systems, 36,9:1210–1216, Sep. 1989.

Tanigawa, Hiroshi, et al., *MOS Integrated Silicon Pressure Sensor*, IEEE Transactions on Electron Devices, 32,7:1191–1194, Jul. 1985.

*Primary Examiner*—Maura K. Regan
*Attorney, Agent, or Firm*—Burns, Doane, Swecker & Mathis, LLP

[57] ABSTRACT

The present invention, generally speaking, provides for highly accurate correction of a sensor output using circuitry that is compact and inexpensive. In accordance with one embodiment of the invention, an output signal of a sensor having a sensitivity that varies as a function of temperature and that includes resistors connected to form a bridge is corrected by, first, modeling the sensitivity of the sensor using an expression that is the ratio of two polynomials; applying a voltage across the bridge; and controlling the applied voltage as a function of temperature substantially in accordance with the inverse expression. In accordance with another embodiment of the invention, a circuit for correcting an output signal of a sensor having a sensitivity that varies as a function of temperature and that includes resistors connected to form a bridge, includes circuitry for applying a voltage across the bridge, and circuitry for controlling said voltage as a function of temperature substantially in accordance with an expression that is the ratio of two polynomials, in which constants a and b are chosen such that an inverse expression approximates the sensitivity of the sensor. Preferably, the circuit is an analog integrated circuit.

6 Claims, 5 Drawing Sheets

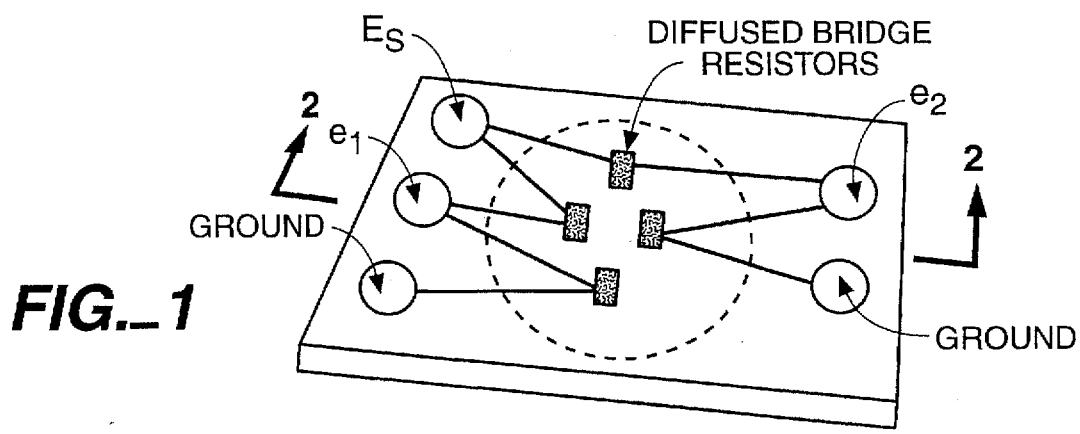
FIG._1
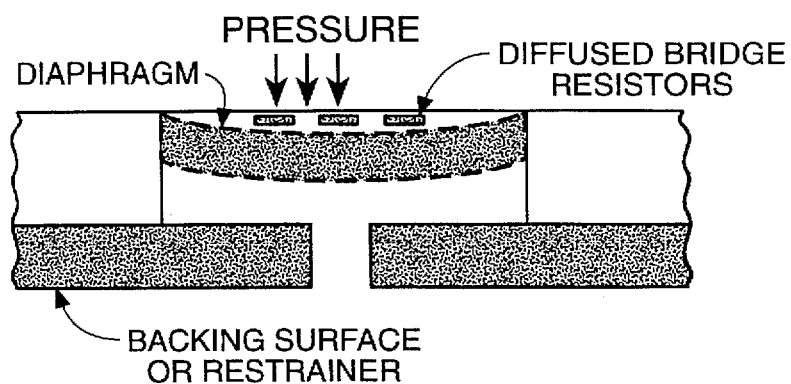
FIG._2 (PRIOR ART)
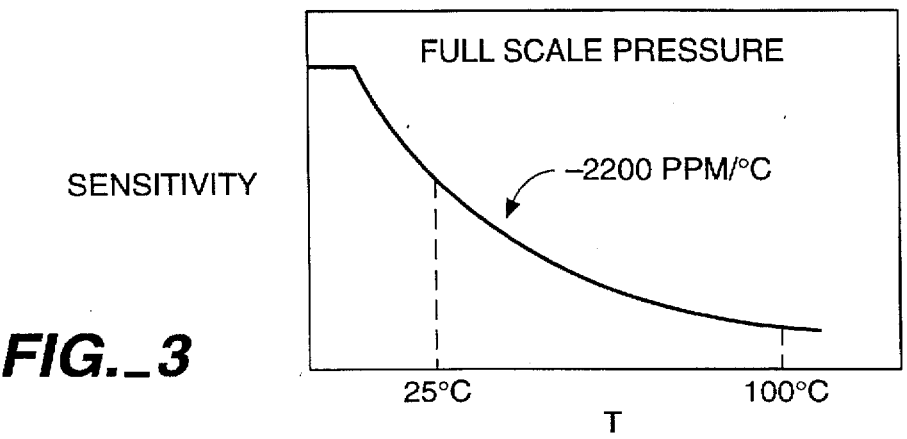
FIG._3

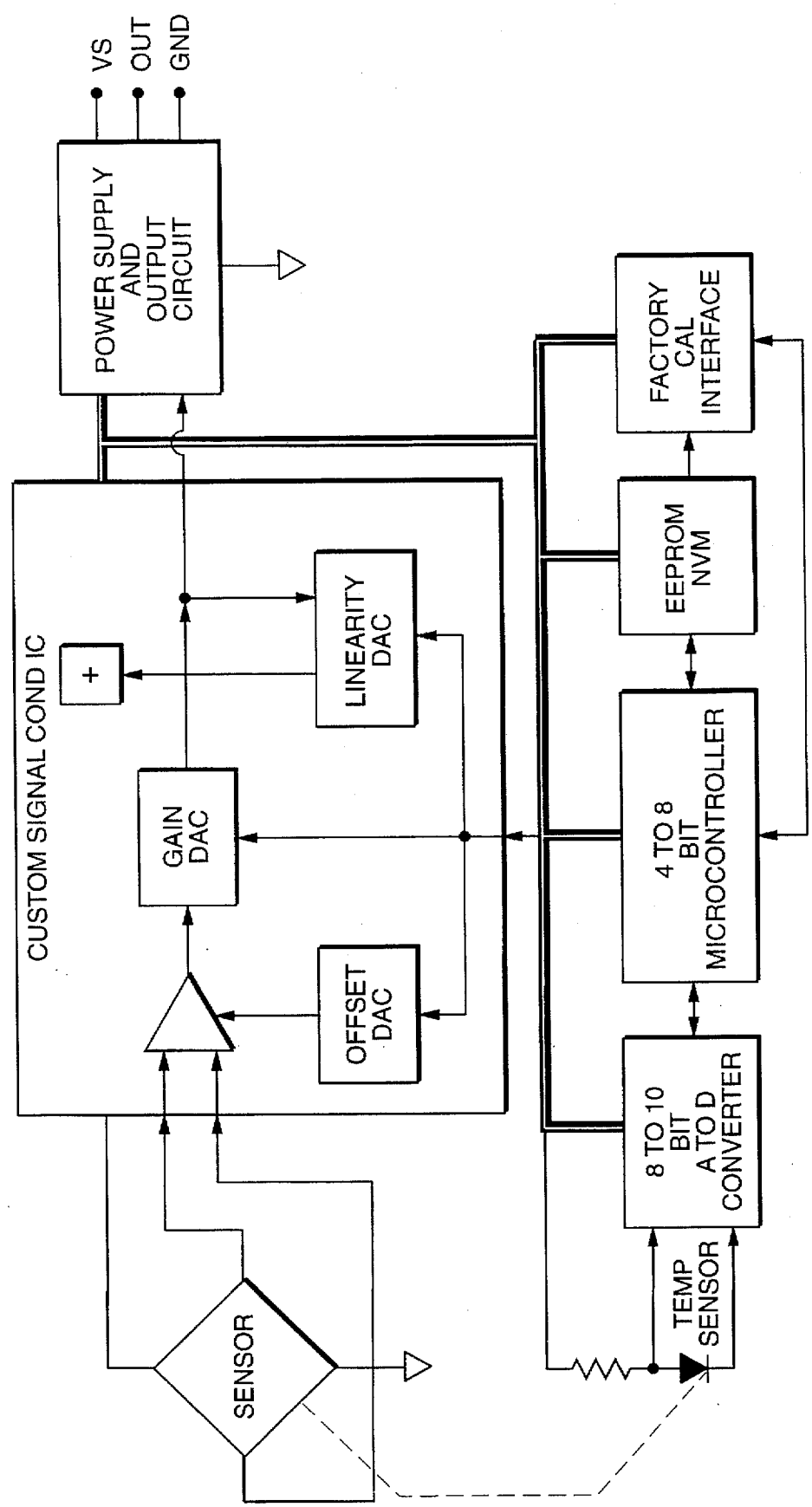
FIG._4 (PRIOR ART)

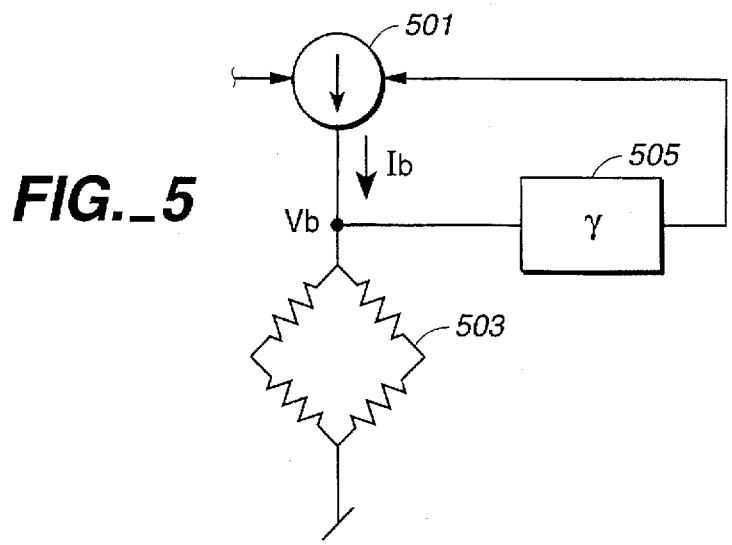
FIG._5
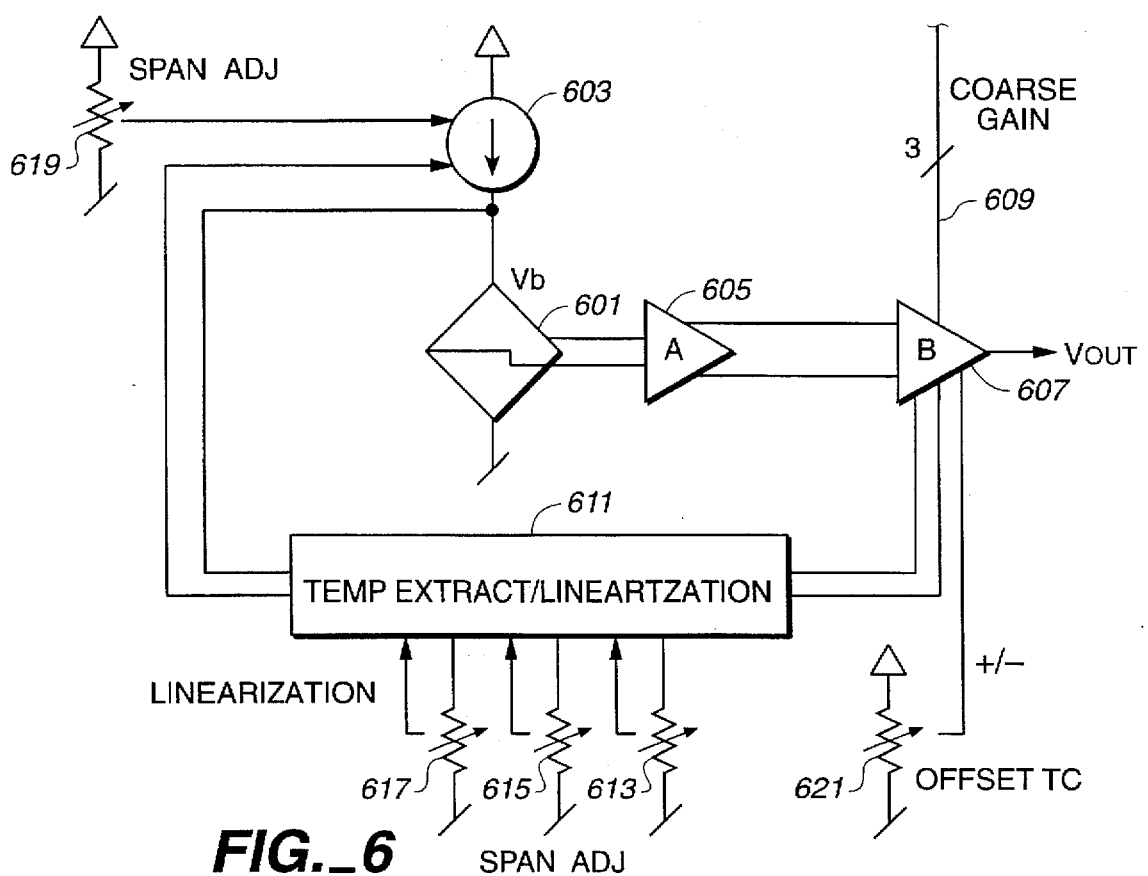
FIG._6

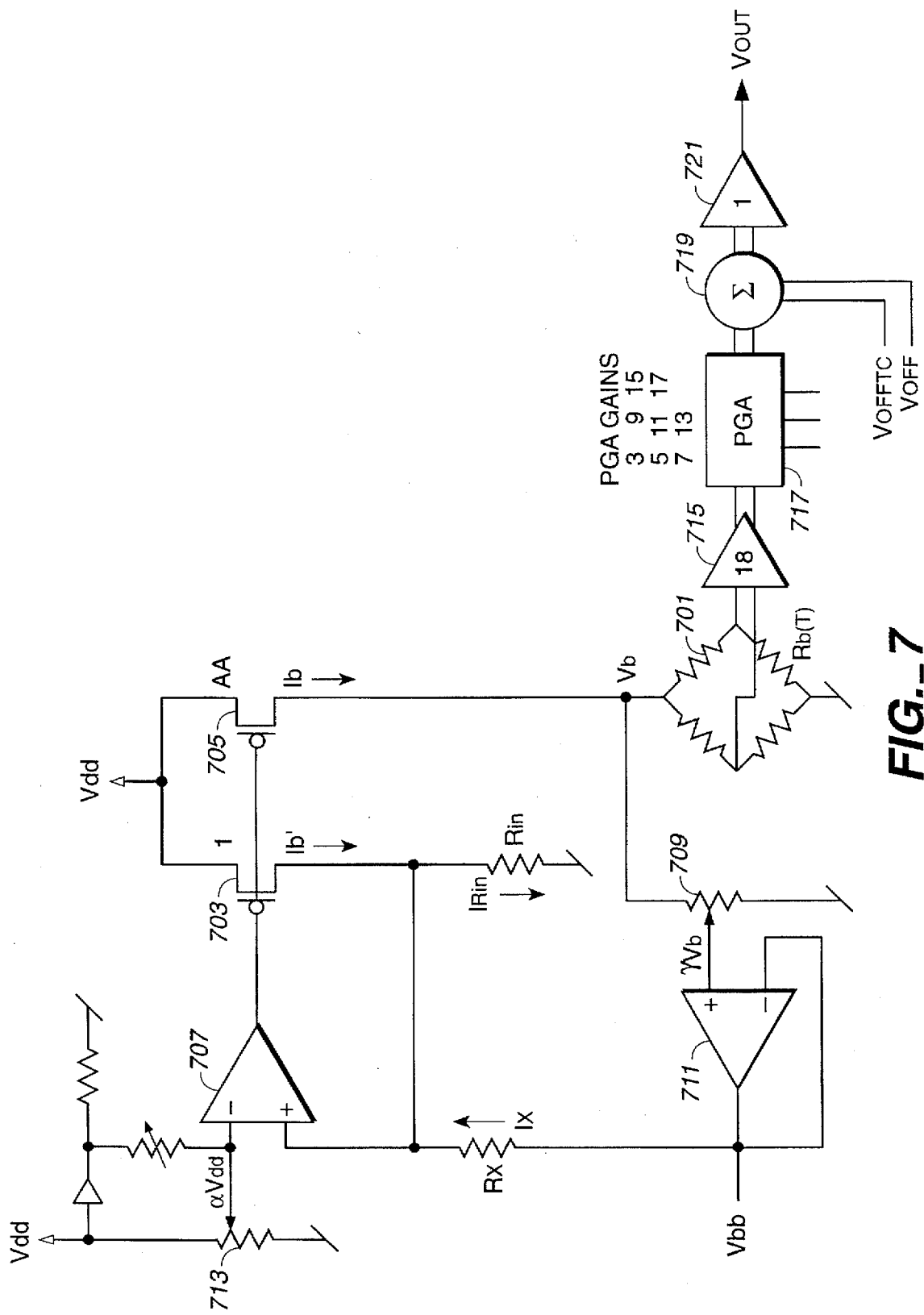
FIG._7

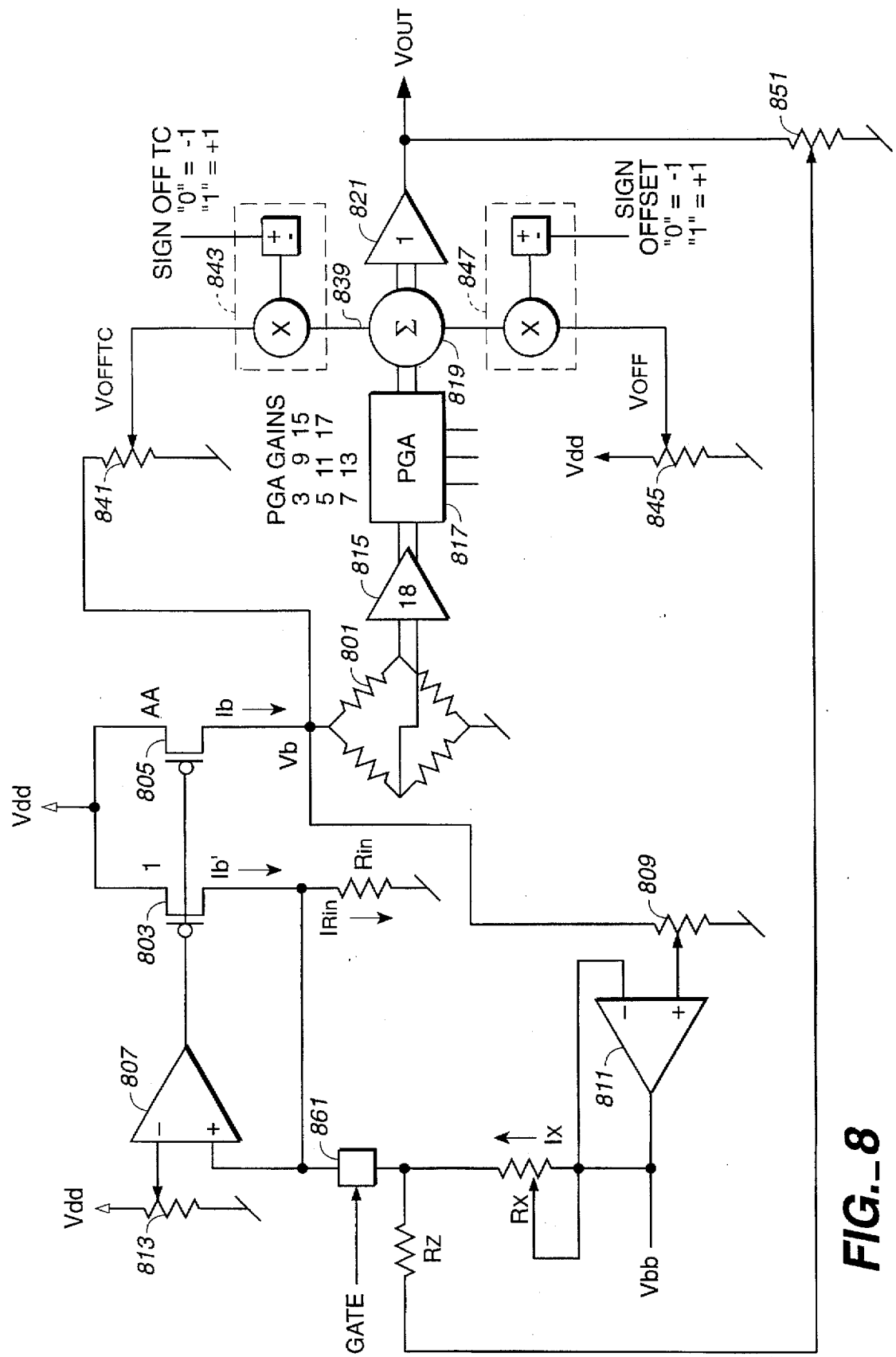
FIG._8

METHOD AND APPARATUS FOR SENSOR SIGNAL CONDITIONING USING LOW-COST, HIGH-ACCURACY ANALOG CIRCUITRY

BACKGROUND OF THE INVENTION

1. Field of the Invention

The present invention relates to sensor signal conditioning, more particularly to compensation circuits for performing temperature compensation of sensor output signals.

2. State of the Art

Sensors and transducers convert physical variables (such as pressure) into an electrical signal. Sensors are often the critical components in determining the feasibility of new products. Recent advances in silicon-based sensor have resulted in almost all new sensor applications being silicon-based. Silicon sensor technology is also displacing older technologies in traditional applications. Traditional applications of sensors include the automotive and medical industries, process and industrial controls, and military and aerospace applications. More recent applications include the consumer products market, communications, computer peripherals, product testing and factory automation.

A typical integrated-circuit pressure transducer is shown in FIG. 1 and FIG. 2. Referring to FIG. 1, diffused bridge resistors are formed on a semiconductor wafer and connected by metallization patterns in a bridge configuration. The bridge may be excited by applying across the bridge a potential E. The difference between a first potential $e_1$ and a second potential $e_2$ at opposite vertices of the bridge is indicative of the pressure being measured. As shown in FIG. 2, the semiconductor wafer is etched so as to form a pressure diaphragm. Variations in pressure cause various amounts of deflection of the pressure diaphragm.

Silicon exhibits an important electromechanical effect, piezoresistivity. When a silicon is strained, its resistivity changes by a reproducible amount. When pressure from a gas or liquid deflects the thin pressure diaphragm, the strain induced causes a change in electrical resistance which can be sensed by external electronics.

The electrical properties of silicon are very temperature dependent. The sensitivity of the sensor, defined as the ratio of the change in transducer output to a change in the value of the measurand (e.g., pressure), therefore changes with temperature. The span, or range, of a transducer is the range of measurand values over which the transducer is intended to measure, specified by upper and lower limits. FIG. 3 shows the full-scale output voltage of a typical piezoresitive transducer (PRT) as a function of temperature. As may be observed, the relation between full-scale output voltage and temperature is highly non-linear. Consequently, most devices will operate accurately only over a limited temperature range. Typically, silicon sensors require temperature compensation. By incorporating appropriate temperature-independent circuitry with the sensor, the temperature range over which sensors will operate accurately can be extended substantially.

PRTs may be operated in either a voltage-excitation mode in which a fixed voltage is applied across the bridge or a current excitation mode in which a fixed current is input to the bridge. In either mode, the full scale output (i.e., the algebraic difference between the end points of the output) is directly proportional to the bridge voltage, $V_b$. With a constant current supplied to the bridge, on the other hand, sensitivity, S, is proportional to the bridge resistance, $R_b$. The full scale output (FSO) of the sensor is therefore given by the following equation.

$$FSO = S \cdot R_b \cdot I$$

Advantageously, the temperature coefficients of S and $R_b$, (TCS) and (TCR), respectively, are of opposite sign, providing some degree of inherent temperature compensation in current excitation mode. However, the magnitudes of the temperature coefficients cannot be adjusted by changes in the semiconductor process so as to be equal. Conventionally, additional compensation is provided by appropriately selecting doping levels such that TCR>|TCS| and then using a combination of temperature-sensitive bridge resistors and temperature-stable external resistors to deliver temperature compensation. For example, FSO temperature compensation may be achieved by connecting a temperature-stable external resistor in parallel to the bridge, thereby decreasing the output resistance of the constant current source. Because of the temperature nonlinearity of both (TCS) and (TCR), however, a linear compensated response cannot be achieved with passive circuitry.

Another approach to compensation involves the use of digital processing electronics to achieve compensation by "brute force." This technique relies on the collection of measurements of pressure and temperature-related outputs from the sensor. Various curve-fitting algorithms may be used, offering trade-offs between simplicity and accuracy. For high-performance applications, a sixth-order polynomial has been used to fit temperature characteristics, delivering accuracy on the order of 1 ppm.

A conventional sensor correction system using a digital microcontroller is shown in FIG. 4. The uncorrected sensor's output is modified in a feedforward approach with temperature as a measured parameter. An expensive custom signal conditioning chip is used to realize a feedforward correction circuit. Calibration coefficients for the feedforward correction circuit are measured and stored in non-volatile memory along with corrections for the sensor element. A temperature sensor in thermal equilibrium with the sensor provides temperature measurements to a microcontroller through an A to D converter. Based on the temperature measurements, the microcontroller looks up the appropriate correction factors to be supplied to the custom signal conditioning chip. D to A converters within the custom signal conditioning chip then apply these correction factors to the sensor's output signal (and to the bridge excitation input) in the analog domain. Such an approach, while it allows highly accurate correction to be achieved, is costly and requires that considerable space be devoted to the correction circuitry.

What is needed, then, is a method of and apparatus for achieving highly accurate correction of a sensor output using circuitry that is compact and inexpensive.

SUMMARY OF THE INVENTION

The present invention, generally speaking, provides for highly accurate correction of a sensor output using circuitry that is compact and inexpensive. In accordance with one embodiment of the invention, an output signal of a sensor having a sensitivity that varies as a function of temperature and that includes resistors connected to form a bridge is corrected by, first, modeling the sensitivity of the sensor using an expression of the form $$\left( \frac{1+aT}{bT} \right)$$

where T represents temperature and a and b are constants; applying a voltage across the bridge; and controlling the applied voltage as a function of temperature substantially in accordance with the expression $$\left( \frac{bT}{1+aT} \right).$$

In accordance with another embodiment of the invention, a circuit for correcting an output signal of a sensor having a sensitivity that varies as a function of temperature and that includes resistors connected to form a bridge, includes circuitry for applying a voltage across the bridge, and circuitry for controlling said voltage as a function of temperature substantially in accordance with the expression $$\left( \frac{bT}{1+aT} \right),$$

where T represents temperature and a and b are constants chosen such that an inverse expression $$\left( \frac{1+aT}{bT} \right)$$

approximates the sensitivity of the sensor. Preferably, the circuit is an analog integrated circuit.

BRIEF DESCRIPTION OF THE DRAWING

The present invention may be further understood from the following description in conjunction with the appended drawing. In the drawing:

FIG. 1 is a plan view of a typical integrated-circuit pressure transducer;

FIG. 2 is a cross-section of the integrated-circuit pressure transducer of FIG. 1;

FIG. 3 is a graph illustrating the temperature-dependent characteristics of a typical integrated-circuit pressure sensor;

FIG. 4 is a block diagram of a conventional sensor correction system;

FIG. 5 is a simplified block diagram of a sensor correction circuit in accordance with the present invention;

FIG. 6 is a more detailed diagram of the sensor correction circuit of FIG. 5;

FIG. 7 is a schematic diagram of the sensor correction circuit of FIG. 6; and

FIG. 8 is a more detailed schematic diagram of the sensor correction circuit of FIG. 7.

DETAILED DESCRIPTION OF THE PREFERRED EMBODIMENTS

The present invention may best be understood by first reviewing briefly certain mathematical principles relating to the approximation of mathematical functions.

Every analytic function can be represented by power series (called Taylor series) of the following form:

$$f(x) = a + bx + cx^2 + dx^3 + ex^4 + \ldots$$

Conventional approaches to sensor correction have typically attempted to approximate sensitivity of the sensor as a function of temperature by ascertaining the coefficients of a first few or first several terms (depending on the required degree of accuracy) of the foregoing equation so as to obtain the closest approximation. As previously described, in applications where high accuracy is required, as many as the first six coefficients may be required, a task that can usually be performed only with the assistance of dedicated software using considerable computational resources. Once the approximating function has been determined, its inverse function may be found and used as a compensation function in order to cause the compensated sensitivity to be, insofar as possible, constant over a desired temperature range.

As recognized by the 19th century mathematician Padé, an analytic function can alternatively be represented in the following form:

$$f(x) = \frac{g(x)}{h(x)} = \frac{a_0 + a_1 x + a_2 x^3 + \ldots}{b_0 + b_1 x + b_2 x^3 + \ldots}$$

It may be shown that, using only the first two terms in the numerator and the first two terms in the denominator, the closeness of approximation is at least as good as that obtained using six terms of the Taylor series described previously. The present method therefore uses the following approximating equation:

$$f(x) = \frac{a_0 + a_1 x}{b_0 + b_1 x}$$

$a_0 = 1$ and $b_0 = 0$, the sensitivity of the sensor as a function of temperature may then be expressed as $$\left( \frac{1+aT}{bT} \right)$$

where T represents temperature and a and b are constants. The output voltage $V_d$ of the sensor, taken at opposite intermediate nodes of the bridge, is given by the product of the bridge voltage, $V_b$, and sensitivity. Mathematically, $$V_d = S \cdot V_b$$

In order to achieve exact correction, the bridge voltage should therefore exhibit a temperature dependence that is the exact inverse of that of sensitivity. By controlling the bridge voltage as a function of temperature substantially in accordance with the expression $$\left( \frac{bT}{1+aT} \right),$$

highly accurate correction may therefore be achieved, since the product of the temperature dependencies of sensitivity and the bridge voltage is then unity.

In order to control the bridge voltage, performing the foregoing calculation digitally with reasonable accuracy and converting between the analog, real-world domain and the digital domain would require relatively expensive circuitry. Instead, the present sensor correction system takes advantage of the properties of feedback circuits to accomplish the equivalent operation entirely in the analog domain.

Referring to FIG. 5, in its most basic form, the sensor correction circuit of the present invention includes a variable current source 501 used to drive the bridge 503 of the sensor and a feedback network 505 used to control the amount of current output by the current source. The bridge voltage is equal to the product of the resistance of the bridge and the current flowing through the bridge. That is, $$V_b = I_b R_b$$

The bridge resistance increases with temperature in accordance with a temperature coefficient that may be controlled by doping. When the doping level is chosen appropriately, the bridge resistance is proportional to temperature, i.e.:

$$R_b(T) = bT$$

where the constant b is the same as the constant b in the expression for sensitivity. Since $V_b(I) = I_b(T)R_b(T)$, the desired temperature dependence of $V_b$ may therefore be obtained by controlling the bridge current so as to exhibit a temperature dependence as follows:

$$I_b(T) = \left( \frac{1}{1+aT} \right)$$

where the constant a is the same as the constant a in the expression for sensitivity. That is, as temperature increases, $I_b$ is controlled using feedback so as to decrease in accordance with the foregoing equation.

Preferably, the present sensor correction circuit is realized in the form of an analog integrated circuit, a block diagram of which is shown in FIG. 6. A sensor bridge 601 is excited using a variable current source 603. The bridge output voltage is amplified in a first amplifier stage 605 having a fixed gain factor A and is further amplified in a second amplifier stage 607 having a variable gain factor G to produce the final output signal Vout. The gain factor G is controlled in part by a three-bit coarse gain control input signal 609.

A temperature extraction/linearization block 611 monitors the bridge voltage $V_b$. It receives as additional inputs an adjustable signal produced by an offset tc potentiometer 613 and used to perform offset temperature compensation, an adjustable signal produced by a span tc potentiometer 615 and used to perform span temperature compensation, and an adjustable signal produced by a linearization (or sensitivity tc) potentiometer 617 and used to perform sensitivity temperature compensation based on the mathematical principles previously described. Furthermore, an adjustable signal produced by a span adj potentiometer 619 sets a fixed component of the excitation current and is used to control the sensor span, and an adjustable signal produced by an offset adj potentiometer 621 is summed with the output signal in the second amplifier stage to perform offset nulling.

FIG. 7 shows a detailed schematic diagram of one possible implementation of the sensor correction circuit of FIG. 6. The sensor bridge 701 is excited by a current source consisting of two P-FET transistors 703, 705 connected in a current mirror configuration and an op-amp 707 that produces a control signal applied to the gate terminals of the two transistors. The transistors are ratioed in accordance with a current ratio AA such that a relatively large current $I_b$ flows into the bridge and a relatively small current $I_b'$ flows through a monitoring resistor $R_{in}$ to ground, thereby saving power. By adjusting the length of the gate of the P-FET 705, higher-order compensation in accordance with Padé's equation may be achieved.

A potentiometer 709 providing the linearity adjustment described previously in relation to FIG. 6 divides the bridge voltage $V_b$ to produce a feedback signal that is input to a second op-amp 711. The output signal of the second op-amp, $V_{bb}$, is fed back to its negative input.

The output signal of the second op-amp, $V_{bb}$, is connected through a resistor $R_x$ to the positive input of the first op-amp 707 and to the resistor $R_{in}$. A current $I_x$ flows through the resistor $R_x$ and combines with the current $I_b'$ to produce a current rent $I_{Rin}$ flowing through the resistor $R_{in}$. The current $I_x$ causes the voltage across $R_{in}$, and hence the voltage at the positive input of the first op-amp 707, to rise, causing the bridge current to change by the appropriate amount to achieve compensation.

A potentiometer 713 connected to the negative terminal of the first op-amp 707 provides a span voltage.

The bridge output signal $V_d$ is amplified by a first amplifier stage 715 (corresponding to the first amplifier stage of FIG. 6) and a second amplifier stage 717 (corresponding in part to the second amplifier stage of FIG. 6) having a variable gain controlled by the three-bit coarse gain input signal previously described. A summing junction 719 is used to add to the output signal of the second amplifier stage a signal $V_{OFF}$ produced by the offset adj potentiometer 621 in FIG. 6 and a signal $V_{OFFTC}$ produced by the offset tc potentiometer 613 in FIG. 6. The offset TC of the sensor therefore gets subtracted from a portion of the bridge voltage. A final unity-gain amplifier stage 721 produces the output signal Vout.

Analysis of the circuit of FIG. 7 reveals that $V_b$ is given by the following equation:

$$V_b = \frac{R_b \cdot AA \left( \frac{\alpha V_{dd}}{R_{in}} + \frac{\alpha V_{dd}}{R_x} \right)}{\left( 1 + \frac{R_b \cdot AA}{R_x} \cdot \gamma \right)}$$

Observe that the foregoing equation may be rewritten as:

$$V_b = k \left( \frac{b \cdot T}{1 + a \cdot T} \right),$$

the desired form.

FIG. 8 shows the circuit of FIG. 7 in greater detail. In FIG. 8, like elements have been assigned reference numeral having the same last two digits as in FIG. 7.

FIG. 8 shows in particular an arrangement whereby the output voltage is compensated by an offset voltage and an offset tc voltage. This arrangement is described in greater detail in U.S. patent application Ser. No. 08/438,635 now U.S. Pat. No. 5,578,962 entitled Instrumentation Amplifier for Sensor Signal Conditioning Using Low-Cost, High-Accuracy Analog Circuitry (Attorney's Docket No. 018018-004), filed on even date herewith and incorporated herein by reference.

Briefly, the offset tc voltage is derived from the bridge voltage $V_b$. A potentiometer 841 is used to divide $V_b$ in accordance with an adjustable ratio to produce a voltage $V_{OFFTC}$. The voltage $V_{OFFTC}$ is input to an amplifier 843, which applies to that voltage a gain of either 1 or −1. The resulting voltage signal 839, representing the desired offset voltage, is input to the summing junction 819.

The offset voltage is produced in a similar fashion. A potentiometer 845 is used to divide, rather than $V_b$, $V_{dd}$, in accordance with an adjustable ratio to produce a voltage $V_{OFF}$. The voltage $V_{OFF}$ is input voltage to an amplifier 847, which applies to that differential voltage a gain of either 1 or −1. The resulting voltage signal 837, representing the desired offset voltage, is input to the summing junction 819.

In addition, a gate 861 is provided in FIG. 8. This gate disables the feedback loop is useful in characterizing the uncompensated sensor. Also, a potentiometer 851 is used to feed back part of the output voltage to a resistor Rz. This feedback path is used to linearize the output voltage over pressure in similar manner as the feedback path containing the resistor Rx is used to linearize the output voltage over temperature. The same mathematical analysis applies equally in the case of the added feedback path containing Rz.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of correcting an output signal of a sensor having a sensitivity that varies as a function of temperature and that includes a plurality of resistors connected to form a bridge, the method comprising the steps of:

sensing a temperature dependent electrical parameter at a node of said bridge;

forming an analog signal that approximates a predetermined ratio of polynomials involving temperature and bearing a predetermined relationship to sensitivity of the bridge; and varying said electrical parameter in accordance with said analog signal.

2. The method of claim 1, wherein each of said polynomials is an odd power series of less than three terms, in accordance with Padé's equation.

3. The method of claim 2, wherein said varying step comprises varying a current applied by a current source to said bridge, said current source including a field effect transistor.

4. The method of claim 3, comprising the further step of adjusting the length of a gate of said field effect transistor in accordance with an order of compensation to be performed.

5. The method of claim 1, comprising the precedent step of modeling said sensitivity of the sensor using an expression of the formula $$\left( \frac{1+aT}{bT} \right)$$

where T represents temperature and a and b are constants; wherein said electrical parameter is bridge voltage, and varying said electrical parameter comprises controlling said bridge voltage as a function of temperature substantially in accordance with the expression $$\left( \frac{bT}{1+aT} \right).$$

6. The method of claim 1 comprising the precedent step of exciting said bridge with an excitation current;

wherein said electrical parameter is excitation current, and varying said electrical parameter comprises varying said excitation current to correct said output signal for variations in temperature.

* * * * *